March 15, 1955 H. J. ANSCHUETZ ET AL 2,704,225
CONVERTIBLE AUTOMOBILE TOP
Filed July 5, 1951 2 Sheets-Sheet 2
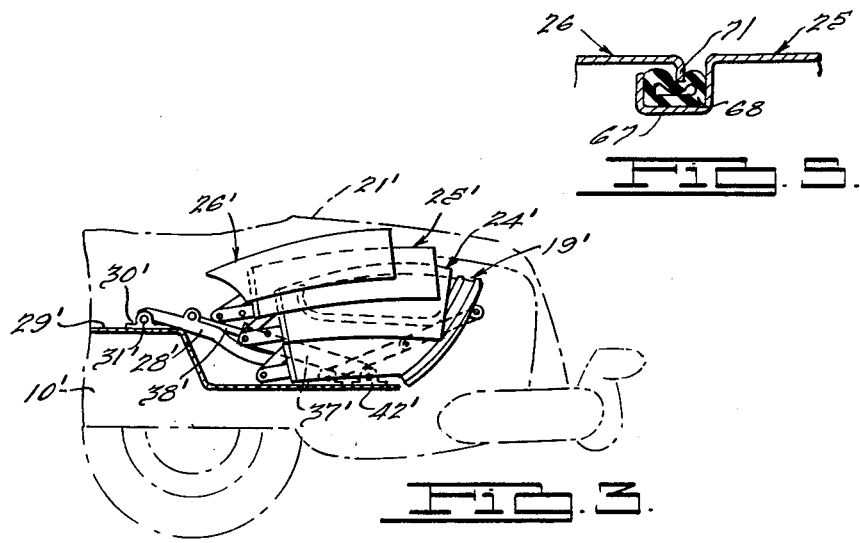
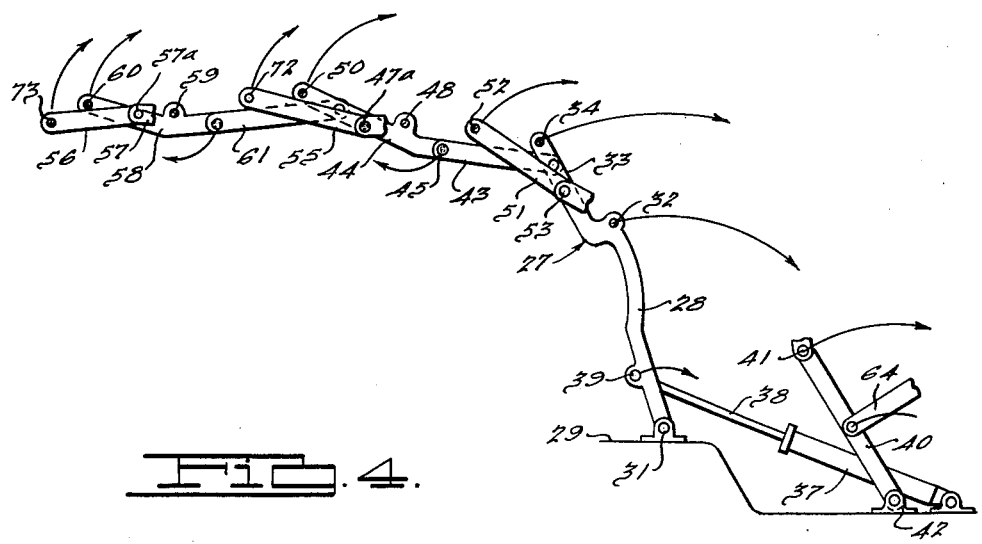
INVENTORS,
Harvey J. Anschuetz,
Louis J. Serratoni.
BY
Harness, Dickey & Pierce.
ATTORNEYS.

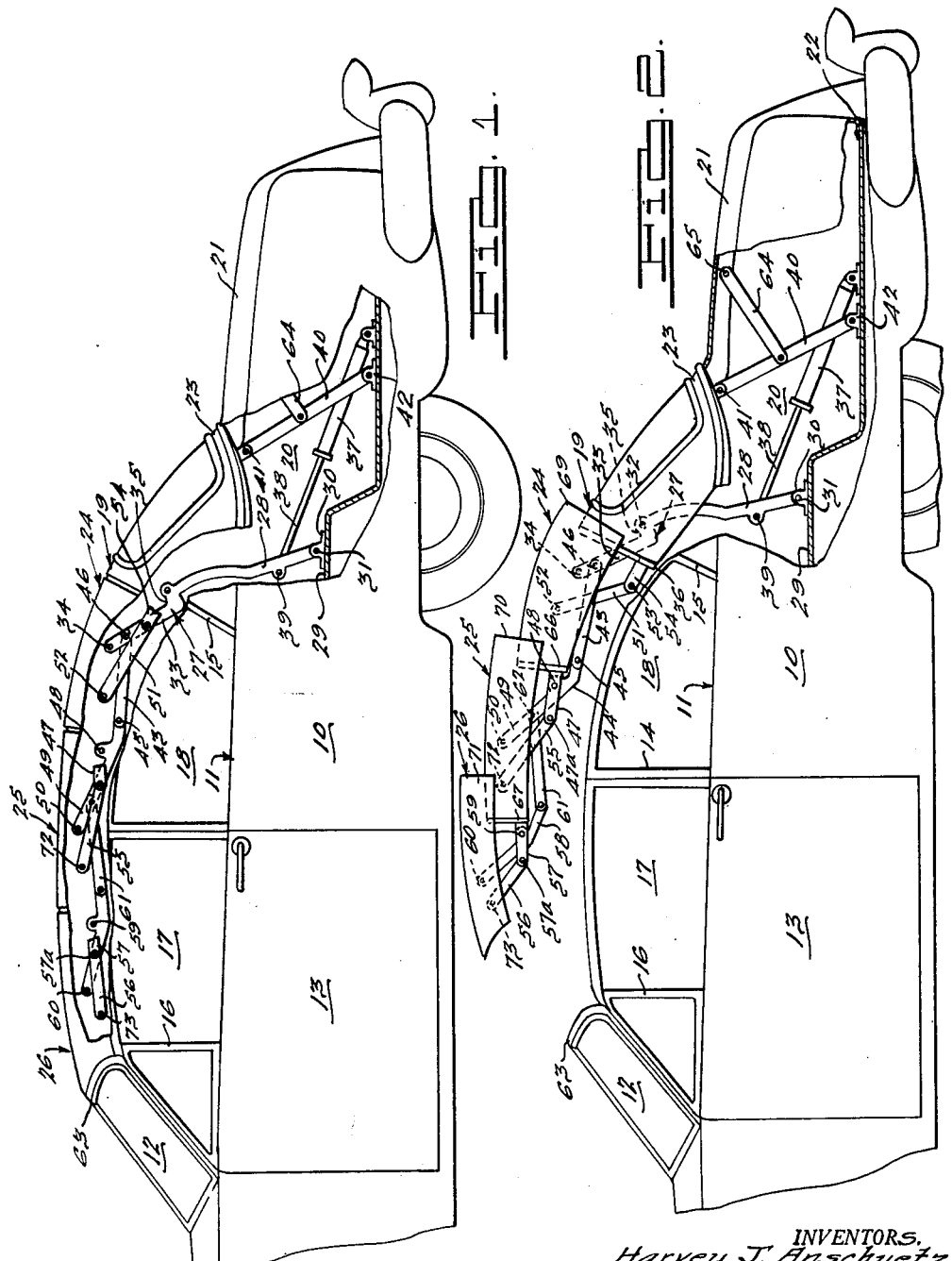

United States Patent Office 2,704,225
Patented Mar. 15, 1955

2,704,225

CONVERTIBLE AUTOMOBILE TOP

Harvey J. Anschuetz, Plymouth, and Louis J. Serratoni, Walled Lake, Mich., assignors to Kaiser Motors Corporation, a corporation of Nevada Application July 5, 1951, Serial No. 235,306

3 Claims. (Cl. 296—107)

The present invention relates to an improved vehicle body construction of the convertible type and more particularly to a collapsible hard top, such as a metal or plastic top, for use with passenger vehicles.

Heretofore various constructions have been proposed to provide an all metal roof construction for automobiles and particularly coupe-type automobiles which were capable of collapsing, telescoping, or folding from a closed body type to an open body type. For example, unitary pivotal shells, sliding shells, a multiplicity of sliding panels etc. have been suggested, all of which, however, are objectionable in some respect, such as restricted utility of the top, blind zones adjacent the rear window, and less desirable styling of both top and body.

It is therefore one of the principal objects of this invention to provide a practical and dependable body construction having a hard or rigid roof portion of metal or plastic which may be collapsed in an easily controllable and dependable manner.

A further and primary object is to provide a hard top construction which features a unique means of sealing the sections of the collapsible roof and of reinforcing the same.

Another object is to provide a construction of the above-mentioned character which may be easily and quickly converted from a closed type of construction to an open type of construction or vice versa.

A further object of this invention is to provide an improved supporting structure for the movable panels of the roof portion to enable the panels to be collapsed into a horizontal nested relationship.

Another object is to provide a convertible construction of the heretofore-mentioned character which overcomes the deficiencies of the heretofore known all metal convertible constructions and in which compactness of construction, power actuation of the collapsible top, simple and convenient control thereof and the like may be achieved in an inexpensive dependable and practical manner.

In accordance with this invention the panels of the top may be suitably contoured to blend with the overall body lines and adapted to interlock with each other and to engage upstanding window and windshield surfaces to thereby form a safe strong weather-tight neat appearing collapsible top. Furthermore the panels may be suitably arranged and supported by an interdependent system of levers or links whereby the top may be automatically lowered into a nested arrangement in the rear deck compartment provided for that purpose.

An arrangement of this type is advantageous since it provides a sedan-type body with the protective features of an all metal top while concurrently providing a practical linkage system for automatically raising and lowering the top to a position that is out of sight without disrupting the neat and unbroken appearance of the body exterior.

The above and further objects and advantageous features of the invention will be apparent as the full description of the invention is developed when taken in conjunction with the accompanying drawings in which:

Figure 1 is a partial side elevational view of an automotive vehicle, with parts broken away showing parts in section and parts in elevation of a collapsible top embodiment of this invention in the closed position;

Figure 2 is a view similar to Figure 1 showing the relationship of the panels during the raising or lowering operation;

Figure 3 is a partially sectioned cut-away view of the rear deck compartment showing the collapsed top in nested relationship;

Figure 4 is a diagrammatic view of the linkage showing the relative motion of the parts thereof during lowering; and Figure 5 is a vertical view of the assembled top of Figure 1 showing a vertical section through a joint between panels.

As may be seen in Figures 1 and 2, an automobile body of the sedan type is shown at 10 having a passenger compartment 11 defined by the windshield 12, the body 10 and doors 13, window frames 14 and 15, ventilator 16, windows 17 and 18, and collapsible top 19. Within body 10 there is provided a rear deck compartment 20 having a pivotal rear deck lid 21 which is suitably hinged at 22 and adapted to be raised automatically to enable the collapsible top 19 to assume a horizontal nested relationship in compartment 20 as may best be seen in Figure 3.

A collapsible top generally indicated at 19 is comprised of a plurality of independently movable panel sections 23, 24, 25 and 26. The number of panels required in the top may vary with the style of automobile body with which it is to be used and it will be apparent that styles having a smaller passenger compartment may require a lesser number of panels. Panels 23, 24, 25 and 26 are preferably made of metal which is suitably reinforced but may be made from other materials, such as rigid plastics. The panels preferably present the outward curve which is required to preserve the continuity of the body contour. Each panel is suitably provided with cushioning and weather-sealing means, such as rubber strip to provide a weather-tight seal with window frames 14, 15 and windows 17 and 18. The rubber strip may be positioned longitudinally along the edges of the interior surface of each panel and in that position serves to prevent scratching and marring of the panel surfaces when the panels are in the nested position.

The longitudinal cushioning means is not to be confused with the transverse sealing means shown in section in Figure 5. The sealing means of Figure 5 is adapted to unify, reinforce and seal the separate panels 23, 24, 25 and 26 into a strong, unitary top. As the result of this construction feature, the collapsible top of this invention is characteristically resistant to deformation and to the elements. The sealing means and the linkage attached to the several panels act in combination to produce a hard top which is reinforced and weathertight, the initial motion of which in lowering and the final motion of which in raising is a vertical motion such that the disconnection and sealing respectively of the several panels is accomplished in a simple, positive and direct manner.

The sealing means is comprised of a suitable flange 67 adapted to accommodate a resilient sealing material 68 such as rubber, which may be deformed by the pressure contact of bent rearward edge 71 of panel 26 to provide a positive seal between the two panels 26 and 25. Panels 23 and 24 are provided with similar flanges 36 and 66 respectively which form seals in contact with edges 69 and 70 of panels 24 and 25 respectively. It should be noted that flanges 36, 66 and 67 and bent rearward edges 69, 70 and 71 provide reinforcement and increased strength to each of the panels in the top 19. The coaction between the linkage and the transverse sealing means will be explained in more detail hereinafter.

As may be seen in Figure 1, panels 23, 24, 25 and 26 are in the normally closed relationship when the attached linkage 27 is in its fully extended position. Figure 2 illustrates the relationship of the panels and the attached linkage 27 during the raising or lowering operation. The linkage 27 is comprised of a guide link 28 suitably secured to the deck floor 29 by pivot 30 for pivotal movement about pin 31. Link 28 is pivotally connected to rear panel 23 at pivot 32 and is provided with an upwardly extending control arm or member 33 which is pivotally connected to panel 24 at pivot 34. Upwardly extending member 33 is suitably curved at 35 to accommodate the protruding forward portion 36 of panel 23 during the raising or lowering of the top.

Guide link 28 is actuated by hydraulic cylinder 37 having a forwardly extending rod portion 38 which is pivotally connected to guide link 28 at pivot 39. Control link or member 40 is attached to the lower rear portion of panel 23 by pivot 41 for guiding the movement of panel 23 about pivot 42 which is suitably secured to rear deck floor 29. Adjacent to but spaced from the upper extremity of member 33 is connecting link 43 which is pivotally connected to control link 44 at pivot 45 and member 33 at pivot 46.

Control link or member 44 is pivoted for rotation on forwardly extending arm member 47 at pivot 48 and its forwardly extending portion 49 is pivotally attached to panel 25 at pivot 50. Panel 24 is provided with guide link 51 pivotally connected thereto at pivot 52 and pivoted for rotation about pivot 53 positioned on forwardly extending arm member 54 which is rigidly secured to the forward portion 36 of panel 23. Similarly, panel 25 and panel 26 are provided with guide links 55 and 56 respectively which are pivotally connected to forwardly extending arm members 47 and 57, respectively at pivots 47a and 57a with the opposite ends thereof attached to panels 25 and 26 at pivots 72 and 73.

Panel 26 is also provided with control link or member 58 pivoted for rotation about pivot 59 located on arm member 57 and secured at its upper extremity to panel 26 at pivot 60. Control member 58 is actuated by power or connecting link 61 which is pivotally connected to arm member 49 at pivot 62. It is evident from the foregoing that each panel of collapsible top 19 is provided with a guide link, a connecting or power link, and a control link or member and that the sole actuating force for the interdependent panels is supplied by hydraulic means 37 at pivot 39 on main guide link 28.

As rod or main power member 38 is fully extended to its forwardmost position, connecting links 43 and 61 coacting with guide links 51, 55 and 56 are fully extended to a position approaching horizontal thereby causing the top 19 to assume the assembled relationship shown in Figure 1. In the fully extended position, the front end of forward panel 26 may be suitably secured to upstanding windshield portion 63 by standard fastenings positioned at the corners thereof or by a single fastening located in the center thereof or both.

When a top of the type shown herein is in its raised position and it is desired to lower the same, the fastenings which secure the forward panel to the windshield standards may first be loosened and the hydraulic means may then be actuated. As may best be seen in Figure 4, as the extended rod 38 is retracted into hydraulic cylinder 37, guide link 28 acts as a master pivot link to actuate connecting links 43 and 61 which cause control links or members 33, 44 and 58 to attempt to pivot about points 32, 48 and 59 respectively.

Inasmuch as panels 23, 24, 25 and 26 form a unitary structure when sealed, it is apparent that the disconnection thereof requires initially a vertical motion to break the seal between panels 26 and 25, then a vertical motion to disconnect panels 25 and 24, etc. As control links or members 33, 44 and 58 are actuated, link 58 will first pivot about point 59 causing a vertical motion of panel 26; panel 25 is then free for initial vertical motion as the result of the pivotal motion of control link 44 about point 48; panel 24 is similarly disengaged from panel 23 and thereafter a combination of horizontal, rotary and vertical motions produces the final nested relationship. Pivot points 32, 48 and 59 are focal pivots for the indicated arcuate motion of the various parts of the linkage 27 during the lowering operation.

Guide links 51, 55 and 56 pivot respectively about pivot points 53, 47a and 57a respectively. Concurrently control links or members 33, 44 and 58 rotate about pivot points 32, 48 and 59 causing pivots 34, 50 and 60 which are attached to panels 24, 25 and 26 respectively to assume the arcuate motion indicated by the arrows from points 34, 50 and 60. The simultaneous horizontal and rotary motion imparted to the interdependent links as noted is simple and efficient and may be represented as the collapsing motion of a series of parallelograms. For example, panel 23 is supported by the collapsible parallelogram consisting of the points 32, 41, 42 and 30; panel 24 is supported by the parallelogram consisting of points 32, 53, 52 and 34, etc. It is to be understood that linkage 27 is duplicated on the opposite side of the panels and operates in an identical manner.

Continued retraction of rod 38 produces the nested relationship illustrated in Figure 3 wherein corresponding parts bear correspondingly primed numbers. As rod 38 begins its rearward travel, control link or member 40 is pivoted about pivot 42 thereby raising deck lid 21 through the pivotal action of arm member 64. It will be apparent that deck lid 21 reaches its maximum degree of opening as control link or member 40 passes through the vertical position and is automatically lowered into its normally closed position when the nesting operation is completed. Arm member 64 is attached to deck lid 21 at detachable pivot 65 to allow lid 21 to be manually raised when it is desired to use the rear deck compartment for storage purposes.

The various links of linkage system 27 are properly shaped to remain in close proximity to the outwardly curved surfaces of panels 23, 24, 25 and 26 to provide head room for the passengers and they are likewise suitably contoured to clear the supporting panels during nesting wherein the entire contact is that of the protective cushioning strips extending along the sides of the panels.

It is thus apparent that there is provided a linkage system which by actuation from one point causes dependently connected panels to be automatically positioned in a nested relationship which is horizontal and compact. When the top is in its normal raised position and the rear lid portion 21 is engaging the same, a continuously relatively smooth and finished appearance is provided for the outer part of the body.

It will be appreciated that for purposes of simplification it has not been attempted to discuss all possible modifications in structure, many of which will be dependent on particular requirements of the manufacturer or on the type of body with which the invention is to be used.

What is claimed is:

1. In a vehicle body construction having a collapsible roof portion, the combination comprising a plurality of transversely extending rigid panels, supporting linkage attached to each of said panels, the linkage attached to a panel comprising a control member and a guide link, said guide link attached to said panel at a point forward of the point of attachment of said control member to said panel, said guide link connecting the forward portion of a panel to the forward portion of the rearwardly adjacent panel, said control member pivoted for rotation about a pivot carried by the forward portion of the rearwardly adjacent panel, a link connecting said control member and the corresponding control member of the rearwardly adjacent panel at a point spaced from the point of attachment of the said corresponding control member to the said rearwardly adjacent panel, each of said panels having a transversely extending channel on the forward edge thereof and a bent downwardly depending rearward edge, resilient material positioned in the said channel adapted to effect a seal between adjacent panels and means for actuating said linkage to extend the said panels and seal the same into a unitary and weathertight structure and to disconnect the said panels and collapse the same into a horizontal nested relationship.

2. In a vehicle body construction, the combination comprising a vehicle body having a two-seat passenger compartment with a deck, having a lid, behind the compartment and a space under said deck, a rigid top movable from a raised position over said compartment to a lowered position within said deck, said top consisting of a plurality of transversely extending, rigid, independently movable panels having connected thereto supporting linkage, each of said panels having a transversely extending channel on the forward edge thereof and a bent downwardly depending rearward edge and resilient means carried in said channel capable of effecting a seal between adjacent panels, said supporting linkage comprising supporting and moving means attached to each panel of the said top, said supporting and moving means comprising a control member and a guide link, said guide link attached to said panel at a point forward of the point of attachment of said control member to said panel, said guide link connecting the forward portion of a panel to the forward portion of the rearwardly adjacent panel, said control member pivoted for rotation about a pivot carried by the forward portion of the rearwardly adjacent panel and linked to the corresponding control member of the rearwardly adjacent panel at a point spaced from the point of attachment of the said corresponding control member to the said rearwardly adjacent panel, hydraulic means for actuating said linkage and automatically lowering said top from its raised position to a nested position within said deck, said linkage and said deck being constructed so that the deck lid is actuated by and simultaneously with the actuation of said linkage.

3. In a vehicle body construction, a vehicle body having a passenger compartment with a deck behind the compartment and a space under said deck, a collapsible roof portion extending over said compartment comprising a plurality of transversely extending movable rigid panel sections, supporting and moving means attached to each said panel comprising a control member and a guide link, said guide link attached to said panel at a point forward of the point of attachment of said control member to said panel, said guide link connecting the forward portion of a panel to the forward portion of the rearwardly adjacent panel, said control member pivoted for rotation about a pivot carried by the forward portion of the rearwardly adjacent panel and linked to the corresponding control member of the rearwardly adjacent panel at a point spaced from the point of attachment of the said corresponding control member to the said rearwardly adjacent panel, means for actuating said linkage in a rearward direction to cause said control member to vertically raise the said panel and thereafter arcuately and horizontally move the said panel into a position immediately above the rearwardly adjacent panel to thereby form a stacked horizontally disposed nested relationship, means for reinforcing and sealing adjacent panels comprising a transversely extending channel on the forward edge of each panel and a bent downwardly depending rearward edge cooperating with the channel in the rearwardly adjacent panel, resilient material positioned in said channel adapted to effect a seal between adjacent panels, and means for actuating said linkage to move said panels from their nested relationship arcuately upwardly and forwardly to seal the said panels into a unitary and weathertight structure.

References Cited in the file of this patent

UNITED STATES PATENTS

| | | |
|---|---|---|
| 1,278,837 | Birney | Sept. 17, 1918 |
| 1,940,444 | Burgman | Dec. 19, 1933 |
| 2,007,873 | Paulin | July 9, 1935 |
| 2,111,885 | Camlessedes | Mar. 22, 1938 |
| 2,181,869 | Carr | Dec. 5, 1939 |
| 2,210,590 | Jobst | Aug. 6, 1940 |